July 31, 1934.  S. HERTZ ET AL  1,968,604
TRANSMITTING GEAR
Filed April 23, 1932  4 Sheets-Sheet 3

INVENTORS
S. Hertz, M. P. Berger
BY Townsend + Decker
ATTORNEYS.

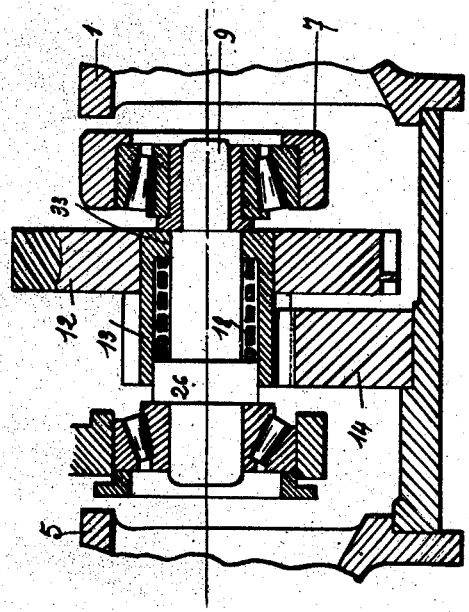
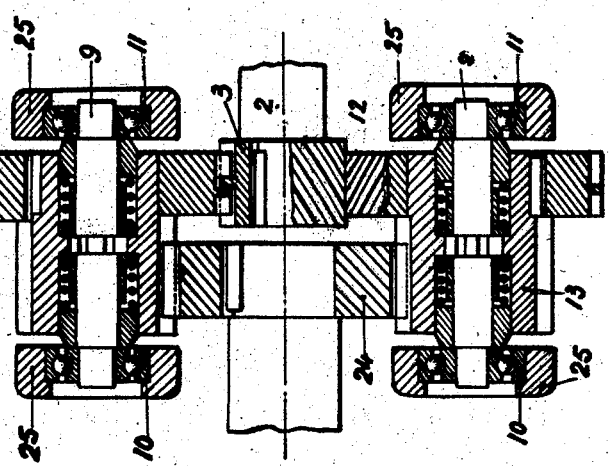

Patented July 31, 1934

1,968,604

UNITED STATES PATENT OFFICE 1,968,604

TRANSMITTING GEAR

Stanislas Hertz and Maurice Pierre Berger, Paris, France

Application April 23, 1932, Serial No. 607,054
In France May 9, 1931

13 Claims. (Cl. 74—305)

The present invention has for its object improvements in or relating to transmitting gears.

In transmitting devices with several transforming stages, it is often desirable, on account of mechanical execution, resistance of materials and noiseless working to use two or more gearing sets simultaneously meshing and working parallel. In this case, it is very difficult to share equally the strain between the different sets and it is necessary to provide an execution approaching perfectness as well in cutting the gear teeth as in placing the shafts.

Said perfectness is no longer necessary in the transmissions according to the present invention. In these latter, in each parallel line, one of the gearing sets is provided with so called helical spur wheel, and one of the pinions thereof is able to undergo an axial displacement against a resilient member under the strain produced by the reaction due to the inclined teeth; said axial displacement thus secures an equal, or substantially equal, sharing of the strains between the different parallel lines of the transmitting device.

The device according to the present invention may be applied for increasing as well as for decreasing speed transmissions.

In the attached drawings, is represented, by way of nonrestrictive example, three forms of execution of the invention applied to speed reducing devices with sun and planet gears and to speed reducing devices with double reduction and two secondary parallel shafts.

In said drawings:

Fig. 4 is a transverse cross-section of the gear through E—F of Fig. 6;

Fig. 5 is a transverse cross-section of the auxiliary shaft through E—F of Fig. 6;

Fig. 6 is a partial longitudinal sectional view of the same apparatus, a group of reacting springs being wholly compressed;

Fig. 7 is a longitudinal sectional view of a speed reducing gear with double reduction and two parallel secondary shafts;

Fig. 8 shows a modification of Fig. 1 in the case of a motor rotating always in the same direction.

Figure 1:
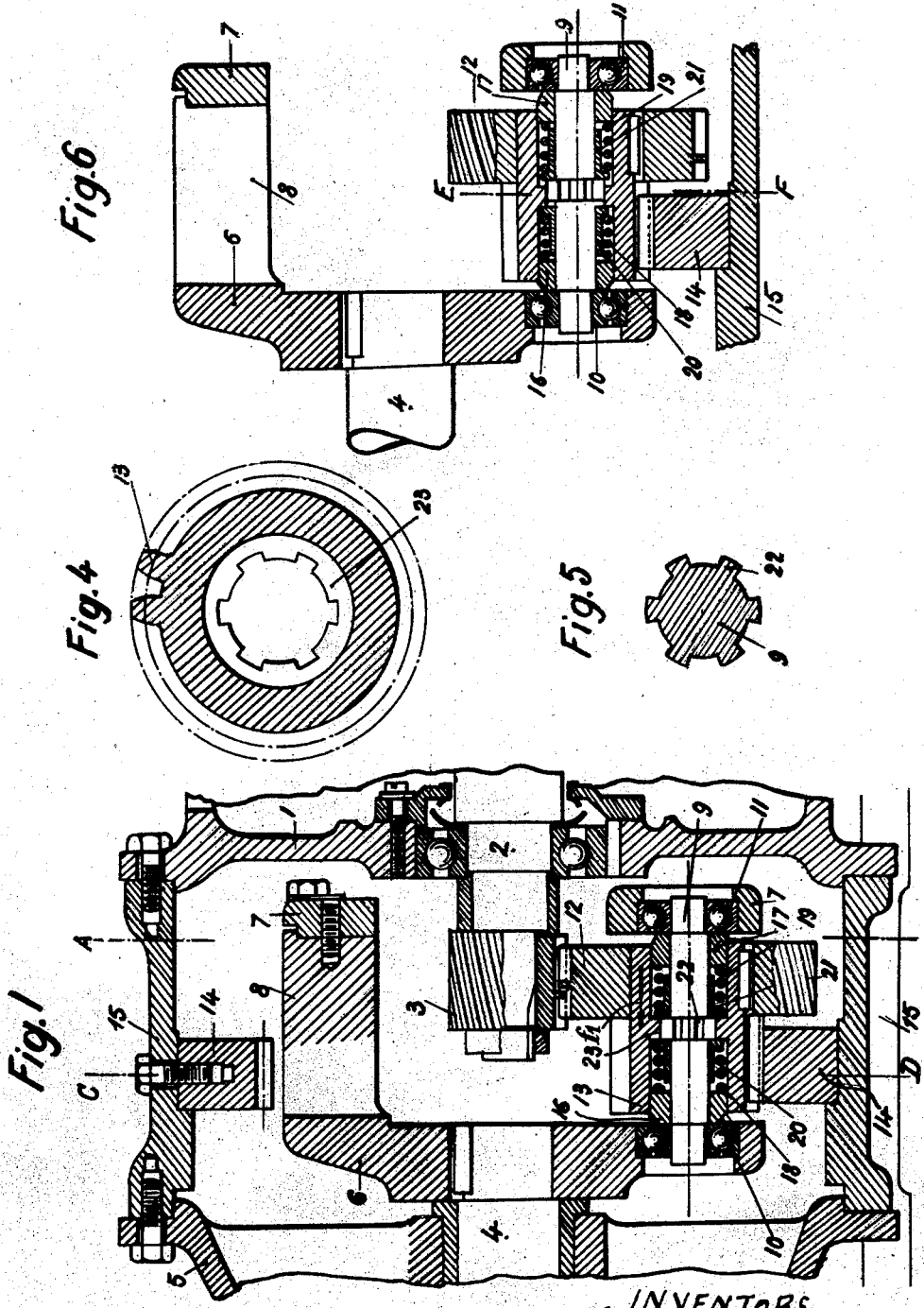
Fig. 1 is a longitudinal cross-sectional view of a speed reducing device with sun and planet gears.
Figure 2:
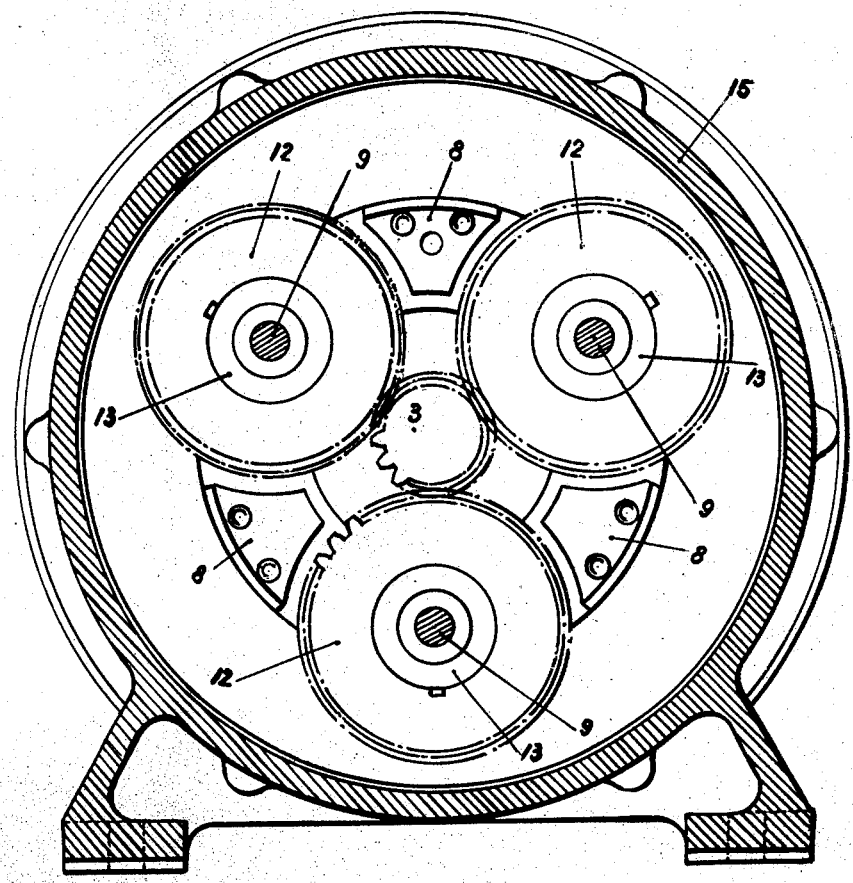
Fig. 2 is a transverse cross-section through A—B of Fig. 1.
Figure 3:
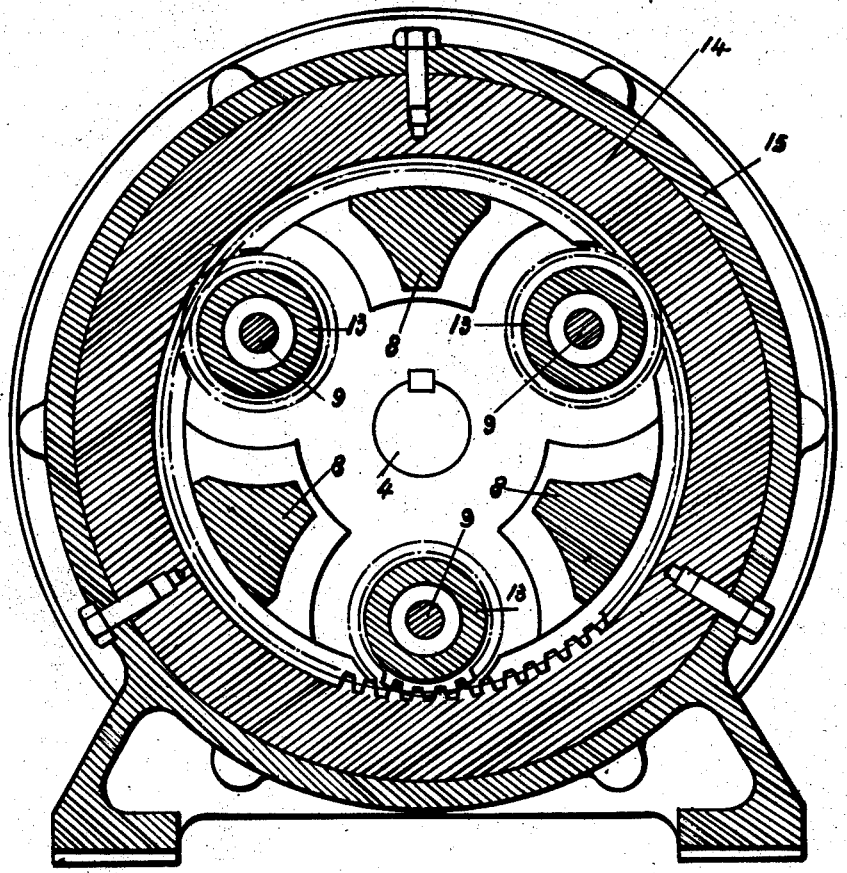
Fig. 3 is a transverse cross-section through C—D of Figure 1.

In the apparatus as represented in Figures 1 to 6, 1 is the end of a motor frame, said motor, electrical or of other kind, driving the apparatus. On shaft 2 of said motor is disposed an obliquely toothed pinion 3, or helical spur pinion, keyed on shaft 2. The reduced speed shaft 4 is journalled in flange 5 and alined with shaft 2. On said shaft 4 is fastened a plate 6. A ring 7 is fastened and centered on plate 6 by three pillars 8 cast in one piece with the plate 6.

Three shafts 9 are supported by plate 6 and ring 7; they are spaced from one another at 120° on a circumference concentrical with shaft 2. Said shafts 9 are journalled in ball bearings 10 and 11 respectively supported by plate 6 and ring 7.

On each of shafts 9 are two sets of toothed wheels 12 and 13 joined to one another. The three wheels 12 are provided with helical teeth and mesh with pinion 3. The three wheels 13 are provided with straight teeth and mesh with a ring 14 provided with inner straight teeth; said ring 14 is fastened in a frame 15 on which are fastened and centered motor 1 and flange 5.

The set of toothed wheels 12 and 13 is able to slide along shaft 9, on which it is centered by cylindrical sleeves 16 and 17. The displacements, in direction of the axis, of the sets 12 and 13 are controlled by two springs 18 and 19 bearing on one side upon sleeves 20 and 21 and on the other side upon sleeves 16 and 17.

Sleeves 16 and 17 are leaning upon ball bearings 10 and 11. Sleeves 20 and 21 are leaning simultaneously upon a shoulder 22 of shaft 9 and upon a shoulder of the hub of wheel 13. Figure 5 illustrates the shape of shoulder 22 and Fig. 4 the shape of shoulder 23. Shoulder 22 consists in a grooved shaft and shoulder 23 in a grooved hub. Said grooves oblige shaft 9 to rotate in the same time as set 12—13 but allow said set to move axially with relation to shaft 9. The axial and radial strains of set 12—13 are thus transmitted to ball bearings 10 and 11.

The working is as follows:

When shaft 2 rotates, pinion 3 drives the three toothed wheels 12 which drive the toothed wheels 13. These latter, owing to their engagement with the fixed ring 14, cause the set constituted by the three shafts 9, ring 7, plate 6 and shaft 4, to rotate in the same direction as shaft 2, according to the well known principle of reducing speed sun and planet gears with three groups of double reducing planetary wheels.

If the manufacturing of the apparatus would be a theoretically perfect one, the strains on the three shafts 9 and the three sets 12—13 should be equal to one another. The tangential strains of the teeth should be equal to one another and therefrom no flexion strain could arise on shaft 2 and 4. Practically, however, this is not possible, and it is because of this impossibility that the device according to our invention is provided for regulating said strains.

If it is assumed that one of the three shafts 9 is slightly shifted with reference to the two other shafts 9 (said shifting being in opposite direction with the rotation direction of shaft 2), the so shifted shaft 9 shall take the whole load or a greater load than the two other ones. The tangential strain between pinion 3 and toothed wheel 12 of the backward shifted shaft 9 will be greater than the tangential strain between pinion 3 and the two remaining toothed wheels 12. If it is further assumed that the direction of the rotation and the inclination of the helical teeth of wheels 3 and 12 are such that the reaction of the teeth produces an axial strain in the direction of arrow $f_1$ upon wheel 12, if springs 18 and 19 received an initial tension equal to the normal strain corresponding to the theoretical balancing of strains, on the backward shifted shaft 9 the axial strain in direction of arrow $f_1$ shall exceed the normal strain; on said shaft 9, shoulder 23 shall push sleeve 20 and compress spring 18, and set 12—13 shall move in the direction of arrow $f_1$ as shown in Figure 6. Said axial displacement will exert no influence on the meshing of toothed wheel 13 with ring 14 since the teeth are straight ones. On the contrary, said axial displacement produces an angular shifting of wheel 12 with relation to pinion 13, owing to the inclination of the helical teeth of wheel 13 and pinion 3; said angular shifting of wheel 12 is produced in the direction opposite to its normal direction of rotation according to the principle of the preservation of energy. This angular shifting of toothed wheel 12 has therefore for its effect to unload the shifted shaft 9 and reciprocally to load the two other shafts 9.

The sets of planetary wheels 12—13 of the two other shafts 9 may then take axial displacements.

The different axial displacements will then be produced till the strains between the three shafts 9 are balanced, said balance being limited to the difference of compression of the springs.

It is to be noted that in Figure 6, springs 19 do not interfere owing to shoulder 22 of shaft 9. Without said shoulder spring 19 should have interfered on shoulder 23 and the strain in direction of arrow $f_1$ should have been counterbalanced by the difference of tension between springs 18 and 19 which would have required greater sizes and more difficult manufacturing of spring 18 and 19.

Springs 19 have for their object to allow an apparatus already provided with spring 18 to work now in a rotating direction and now in the opposite one.

It is advantageous to choose for the helical gearing of pinion 3 and wheels 12 a normal diametral pitch (pitch of cutter) $p$ and a helix angle $\alpha$, such that pitch $p$ multiplied by the cosinus $\alpha$ be equal to the diametral pitch of the wheels 13 and internal gear 14. If said condition is fulfilled, it makes more easy the industrial construction of apparatuses having different reduction rate but using frames 15 having all the same size.

The speed reducing device shown in Figure 7 has, on account of the invention, an essential constitution and a working similar to those of the speed reducing device above disclosed. In said figure, 3 is a pinion the teeth of which are helical, keyed on motor shaft 2; 4 is the shaft rotating with reduced speed; toothed wheel 24 is keyed upon shaft 4.

The two secondary shafts 9 are journalled in ball bearings 10 and 11 supported by members 25 fastened to the general frame (not shown).

The two toothed wheels 12 are provided with helical teeth and mesh with pinion 3. The two toothed wheels 13 are provided with straight teeth and mesh with wheel 24 also provided with straight teeth.

A modification consists in fastening wheel 13 with shaft 9, wheel 12 being able to slide, with relation to shaft 9, against the action of a spring while it should communicate to said shaft 9 its rotation. In said case, wheels 13 have no more axial displacement; consequently wheels 13 and the toothed ring or wheel with which they mesh may be helical or double helical gears.

As explained above the two springs 18 and 19 are necessary only to allow the motor to rotate in both directions. In cases wherein said motor can rotate only in a single direction, it is possible to use the more simple device illustrated in Figure 8; said figure shows a part of a device similar to that of Figure 1, the same reference numbers indicating the same parts; spring 19 is omitted and the only remaining spring 18 bears on one side upon shoulder 33 corresponding to shoulder 23 of Figure 1, and on the other side shoulder 26 corresponding to shoulder 16 of Figure 1. The working of the two devices is exactly the same.

What we claim is:

1. A transmitting gear between two co-axial shafts, comprising a helical driving gear fast with respect to the driving shaft, a plurality of sets of planetary gears comprising each a helical driven gear meshing with said driving gear, a spur gear fixed to said helical driven gear, an axial hole through each of said sets, an auxiliary shaft within said hole, balancing resilient means resisting the sliding displacement of said set in one direction with respect to the auxiliary shaft, and means in mesh with the spur gears for causing transmission of the rotation of the several sets to the driven shaft.

2. A transmitting gear between two co-axial shafts comprising a helical driving gear fast with respect to the driving shaft, a plurality of sets of planetary gears comprising each a helical driven gear meshing with said driving gear, a spur gear fixed to said helical driven gear, an axial hole through each of said sets, an auxiliary shaft within said hole, said hole providing an internal annular space around the auxiliary shaft and said shaft having a shoulder within said space, and a pair of springs on said auxiliary shaft within said space and on opposite sides of said shoulder for balancing displacement of the set longitudinally of the shaft, and means in mesh with the spur gears for causing transmission of the rotation of the several sets to the driven shaft.

3. A transmitting gear between two co-axial shafts comprising a helical gear fast with respect to the driving shaft, a plurality of sets of planetary gears comprising each a helical driven gear meshing with said driving gear, a spur gear fixed to said helical driven gear, an axial hole through each of said sets, an auxiliary shaft within said hole, said hole providing an internal annular space around the auxiliary shaft and said shaft having a shoulder within said space, fixed shoulders at the ends of said space, and a spring in said space between each of the said end shoulders and the shoulder on the shaft, and means in mesh with the spur gears for causing transmission of the rotation of the several sets to the driven shaft.

4. A transmitting gear between two axial shafts, comprising a helical driving gear fast with respect to the driving shaft, a plurality of sets of planetary gears comprising each a helical driven gear meshing with said driving gear, a spur gear fixed to said helical driven gear, an axial hole through each of said sets, an auxiliary shaft within said hole, said hole providing an internal annular space around the auxiliary shaft and having an inwardly directed shoulder therein and said shaft having an outwardly directed shoulder in said space, and a pair of springs on said auxiliary shaft within said space on opposite sides of said shoulders for balancing displacement of the set longitudinally of the shaft, and means in mesh with the spur gears for causing transmission of the rotation of the several sets of the driven shaft.

5. A transmitting gear between two co-axial shafts, comprising a helical driving gear fast with respect to the driving shaft, a plurality of sets of planetary gears comprising each a helical driven gear meshing with said driving gear, a spur gear fixed to said helical driven gear, an axial hole through each of said sets, an auxiliary shaft within said hole, said hole providing an internal annular space around the auxiliary shaft and having midway thereof an inwardly directed shoulder therein and said shaft having an outwardly directed shoulder in said space midway thereof, longitudinally fixed shoulders at the ends of said space, and a pair of springs on said auxiliary shaft within said space, one between said midway shoulders and one end shoulder and the other between said midway shoulders and the other end shoulder for balancing displacement of the sets longitudinally of the shaft, and means in mesh with the spur gears for causing transmission of the rotation of the several sets to the driven shaft.

6. A transmitting gear between two co-axial shafts, comprising a helical driving gear fast with respect to the driving shaft, a plurality of sets of planetary gears comprising each a helical driven gear meshing with said driving gear, a spur gear fixed to said helical driven gear, an axial hole through each of said sets, an auxiliary shaft within said hole, said hole providing an internal annular space around the auxiliary shaft and having midway thereof an inwardly directed gear-like shoulder therein and said shaft having an outwardly directed gear-like shoulder in said space midway thereof, said gear-like shoulders intermeshing and movable axially with respect to each other in either direction, and a pair of springs on said auxiliary shaft within said space upon opposite sides of said shoulders for balancing displacement of the set longitudinally of the shaft, and means in mesh with the spur gears for causing transmission of the rotation of the several sets of the driven shafts.

7. A transmitting gear between two co-axial shafts comprising a helical driving gear fast with respect to the driving shaft, a plurality of sets of planetary gears comprising a helical driven gear meshing with said driving gear, a spur gear fixed to said helical driven gear, an axial hole through each of said sets, an auxiliary shaft within said hole, balancing resilient means resisting the sliding displacement of said sets in both directions, and means in mesh with the spur gears for causing transmission of the rotation of the several sets to the driven shaft.

8. A transmitting gear between two co-axial shafts, comprising a helical driving gear fast with respect to the driving shaft, a plurality of sets of planetary gears comprising each a helical driven gear meshing with said driving gear, a spur gear fixed to said helical driven gear, an axial hole through each of said sets, an auxiliary shaft within said hole, said hole providing an internal annular space around the auxiliary shaft and said shaft having a shoulder within said space, and a spring on said auxiliary shaft within said space and on a side of said shoulder for balancing displacement of the set longitudinally of the shaft, and means in mesh with the spur gears for causing transmission of the rotation of the several sets to the driven shaft.

9. A transmitting gear between two co-axial shafts, comprising a helical gear fast with respect to the driving shaft, a plurality of sets of planetary gears comprising each a helical driven gear meshing with said driving gear, a spur gear fixed to said helical driven gear, an axial hole through each of said sets, an auxiliary shaft within said hole, said hole providing an internal annular space around the auxiliary shaft and said shaft having a shoulder within said space, shoulders at the ends of said space, and a spring in said space between each of the said end shoulders and the shoulder on the shaft for resisting the sliding displacement of the set in either direction and means in mesh with the spur gears for causing transmission of the rotation of the several sets to the driven shafts.

10. A transmitting gear between two co-axial shafts, comprising a helical driving gear fast with respect to the driving shaft, a plurality of sets of planetary gears comprising each a helical driven gear meshing with said driving gear, a spur gear fixed to said helical driven gear, an axial hole through each of said sets, an auxiliary shaft within said hole, said hole providing an internal annular space around the auxiliary shaft, the set having an inwardly directed shoulder in said space and said shaft having an outwardly directed shoulder in said space, and a pair of springs on said auxiliary shaft within said space and on opposite sides of said shoulders for balancing displacement of the set longitudinally in each direction of the shaft, and means in mesh with the spur gears for causing transmission of the rotation of the several sets of the driven shaft.

11. A transmitting gear between two co-axial shafts, comprising a helical driving gear fast with respect to the driving shaft, a plurality of sets of planetary gears comprising each a helical driven gear meshing with said driving gear, a spur gear fixed to said helical driven gear, an axial hole through each of said sets, an auxiliary shaft within said hole, said set providing an internal annular space around the auxiliary shaft and having midway thereof an inwardly directed shoulder therein and said shaft having an outwardly directed shoulder in said space midway thereof, longitudinally fixed shoulders at the ends of said space, and a pair of springs on said auxiliary shaft within said space, one between said midway shoulders and one end shoulder and the other between said midway shoulders and the other end shoulder for balancing displacement of the set longitudinally in either direction of the shaft, and means in mesh with the spur gears for causing transmission of the rotation of the several sets to the driven shaft.

12. A transmitting gear between two co-axial shafts comprising a helical driving gear fast with respect to the driving shaft, a plurality of sets of planetary gears comprising each a helical driving gear meshing with said driven gear, a spur gear fixed to said helical driven gear, an axial hole through each of said sets, an auxiliary shaft within said hole, said hole providing an internal annular space around the auxiliary shaft and having midway thereof an inwardly directed gear-like shoulder therein and said shaft having an outwardly directed gear-like shoulder in said space midway thereof, said gear-like shoulders intermeshing and movable axially with respect to each other in either direction, and a pair of springs on said auxiliary shaft within said space upon opposite sides of said shoulders for balancing displacement of the set longitudinally in either direction of the shaft and means in mesh with the spur gear for causing transmission of the rotation of the several sets of the driven shaft.

13. In a transmitting gear according to claim 5, sleeves slidably engaged upon said shaft, said sleeves having flanges interposed between said springs and said mid-way shoulders.

MAURICE PIERRE BERGER.
STANISLAS HERTZ.